US010597166B2

(12) United States Patent
Thornton et al.

(10) Patent No.: US 10,597,166 B2
(45) Date of Patent: Mar. 24, 2020

(54) IN-FLIGHT REFUELING PROBE FOR AN AIRCRAFT

(71) Applicants: Hope T. Thornton, San Diego, CA (US); Warren Lang, San Diego, CA (US); Bryan Holt, San Diego, CA (US)

(72) Inventors: Hope T. Thornton, San Diego, CA (US); Warren Lang, San Diego, CA (US); Bryan Holt, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1870 days.

(21) Appl. No.: 13/694,545

(22) Filed: Dec. 12, 2012

(65) Prior Publication Data

US 2019/0055032 A1 Feb. 21, 2019

(51) Int. Cl.
*B64D 39/06* (2006.01)
*B64D 39/04* (2006.01)
*B67D 7/32* (2010.01)

(52) U.S. Cl.
CPC .......... *B64D 39/06* (2013.01); *B64D 39/04* (2013.01); *B67D 7/32* (2013.01)

(58) Field of Classification Search
CPC .......... B64D 39/06; B64D 39/04; B67D 7/32; B67D 7/00
See application file for complete search history.

(56) References Cited

U.S. PATENT DOCUMENTS

| 2,849,200 | A | * | 8/1958 | Person | B64D 39/04 |
| | | | | | 244/135 A |
| 2,946,605 | A | * | 7/1960 | Mosher | B64D 39/06 |
| | | | | | 137/614.03 |
| 3,059,895 | A | * | 10/1962 | Brown | B64D 39/06 |
| | | | | | 137/614.03 |
| 3,108,769 | A | * | 10/1963 | Hieber | B64D 39/00 |
| | | | | | 244/135 A |
| 3,586,033 | A | * | 6/1971 | Hieber | B64D 39/06 |
| | | | | | 137/220 |
| 3,874,410 | A | * | 4/1975 | Clark | G05D 16/10 |
| | | | | | 137/220 |

(Continued)

OTHER PUBLICATIONS

International Search Report for corresponding PCT/US2013/074802 completed Sep. 18, 2014 by Ennio Cesaro.

*Primary Examiner* — Assres H Woldemaryam
(74) *Attorney, Agent, or Firm* — Tarolli, Sundheim, Covell & Tummino LLP

(57) ABSTRACT

An in flight refueling probe for an aircraft includes a circular shaped hollow tubular member having a first end attached to the aircraft and a second end extending from the aircraft terminating in an external convex shape with a plurality of first holes equally spaced thereabout. A cylindrical member having a first end with an internal curved surface convex shaped end of the tubular member with a plurality of second holes there through in alignment with the plurality of first holes in the second end of the tubular member with fasteners installed in the holes joining the cylindrical member to the tubular member. The fasteners have a strength limited to a value that will break under a specific load on the probe. A nozzle assembly is mounted to the second end of the cylindrical member for coupling to the receptacle on a fuel dispensing aircraft.

7 Claims, 6 Drawing Sheets

(56) References Cited

U.S. PATENT DOCUMENTS

| | | | |
|---|---|---|---|
| 4,998,560 A | 3/1991 | Le Devehat et al. | 137/616 |
| 6,050,297 A | 4/2000 | Ostrowski et al. | 137/614.04 |
| 6,516,920 B1 | 2/2003 | Schafler | 244/135 A |
| 2012/0018039 A1* | 1/2012 | Mouskis | B64D 39/06 141/192 |
| 2015/0203210 A1* | 7/2015 | Espinosa Sanchez | B64D 39/06 137/505 |

* cited by examiner

IN-FLIGHT REFUELING PROBE FOR AN AIRCRAFT

GOVERNMENT INTEREST

The invention was made under US Air Force Contract Number HR0011-10-C-0076. Therefore, the US Government has rights to the invention as specified in that contract.

BACKGROUND OF THE INVENTION

The in flight refueling of aircraft is a very important capability in that it allows for extended range of the aircraft. Typical refueling apparatus comprise a fuel tube extending from the refueling aircraft terminating in a receptacle for receiving a refueling probe extending from the aircraft to be refueled. Typically, the nozzle at the end of the refueling probe of the aircraft being refueled is a Military Standard part; for example, MS 24356(ASG) Nozzle-Type PA-2 Flight Pressure Refueling The Receptacle on the refueling line of the refueling aircraft is also a Military Standard part, for example, MS 24354 (ASG) Drogue, Nozzle And Refueling Coupling—Type MA-2 Flight-Pressure-Refueling System-Assembly Of.

A problem, though rare, that occurs is that the nozzle on the aircraft being refueled becomes stuck in the receptacle on the refueling aircraft. Thus to prevent damage to either aircraft, a separation system is necessary. These typically involve the use a fuse that will separate the sides if a predetermined force is applied to the jointed receptacle and nozzle.

For example, U.S. Pat. No. 7,516,920 In-Flight Refueling System And Method For Facilitating Emergency Separation Of In-Flight Refueling System Components by S. B. Schroeder discloses a bolted flange in the refueling boom. This flange is designed to break under a specified overload. It has the disadvantage of leaving a portion of the refueling line attached to the aircraft being refueled.

Another example can be found in U.S. Pat. No. 6,050,297 Breakaway Hose Coupling For Fuel Dispensing by Gary M. Ostruwski, et al. discloses a refueling probe that is held together by a tubular retainer having a cup shaped cross-section. The ends of the clamp fit into grooves one each portion of the probe. The cup is designed to break under a specified overload. The disadvantage is that retainer upon breaking, can hit the aircraft being refueled.

A further example is found in U.S. Pat. No. 4,998,560 Fluid Loading Arm Emergency Disconnect System by E. Le Devehat discloses a refueling probe that must be actuated hydraulically to separate. This is accomplished by use of a moveable sleeve mounted on a first half that retains ball detents holding one half of the probe in place. Upon actuation the sleeve is withdrawn allowing the ball detents to disengage from the second half. This device has the disadvantage of not being automatically operated upon an overload.

Therefore, it is a primary object of the invention to provide a refueling probe that will separate the nozzle from the refueling probe assembly upon the nozzle becoming stuck in the refueling receptacle upon a specified load being applied to the jointed parts.

It is another object of the invention to provide a refueling probe that will separate the nozzle from the refueling probe assembly upon the nozzle becoming stuck in the refueling receptacle upon a specified load being applied to the jointed parts that is reusable only requiring new fasteners.

It is a further object of the invention to provide a refueling probe that will separate the nozzle from the refueling probe assembly upon the nozzle becoming stuck in the refueling receptacle upon a specified load being applied to the jointed parts that upon separation ejects no or a minimum of debris.

SUMMARY OF THE INVENTION

The invention is an in flight refueling probe for an aircraft that is to be refueled by a tanker aircraft having a receptor for receiving a nozzle mounted on the end of the refueling probe. In detail, the invention includes a circular shaped tubular member having first and second ends. The first end of the circular shaped member is mounted to the aircraft to be refueled and the second extending from the aircraft, the tubular shaped member includes an internal passage extending from first end to second end with second end terminating in a convex shape. The convex shaped second end of the tubular shaped member includes a plurality of first holes equally spaced thereabout.

A cylindrical member include a first end having a concave surface engaged with said convex end of the tubular member. The first end of the cylindrical member also includes a plurality of second holes there through in alignment with plurality of first holes in the second end of the tubular member. A plurality of fasteners, preferably rivets, that extend through the first and second holes joining the first end of the cylindrical member to the second end of the tubular member. A nozzle assembly is attached the second of the cylindrical member. The fasteners are designed to have a strength limited to a value that will break under a specific load on the probe. A sealing assembly is mounted on the convex surface. Preferably, the convex and concave surfaces are spherical in shape in the area of the sealing assembly.

While the invention has been described with reference to a particular embodiments, it should be understood that the embodiments are merely illustrative as there are numerous variations and modifications, which may be made by those skilled in the art. Thus, the invention is to be construed as being limited only by the spirit and scope of the appended claims.

BRIEF DESCRIPTION OF THE DRAWINGS

Illustrated in FIG. 1 is partial view of an aircraft being refueled by a tanker aircraft.

Illustrated in FIG. 2 is a partial cross-sectional view of FIG. 1 enlarged to show the refueling probe on the aircraft being refueled and the receptacle on the tanker aircraft.

Figure 2:
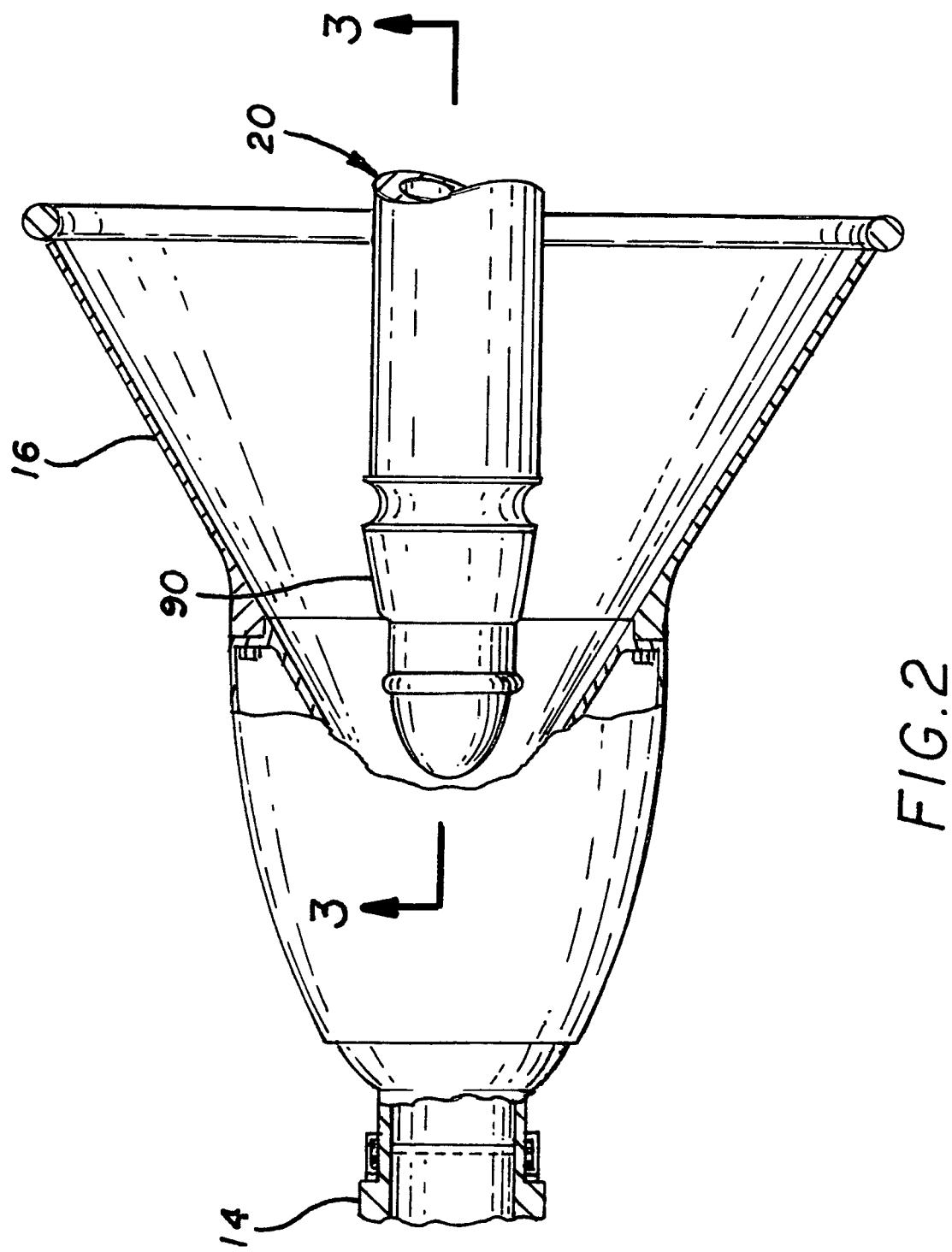
Figure 3:
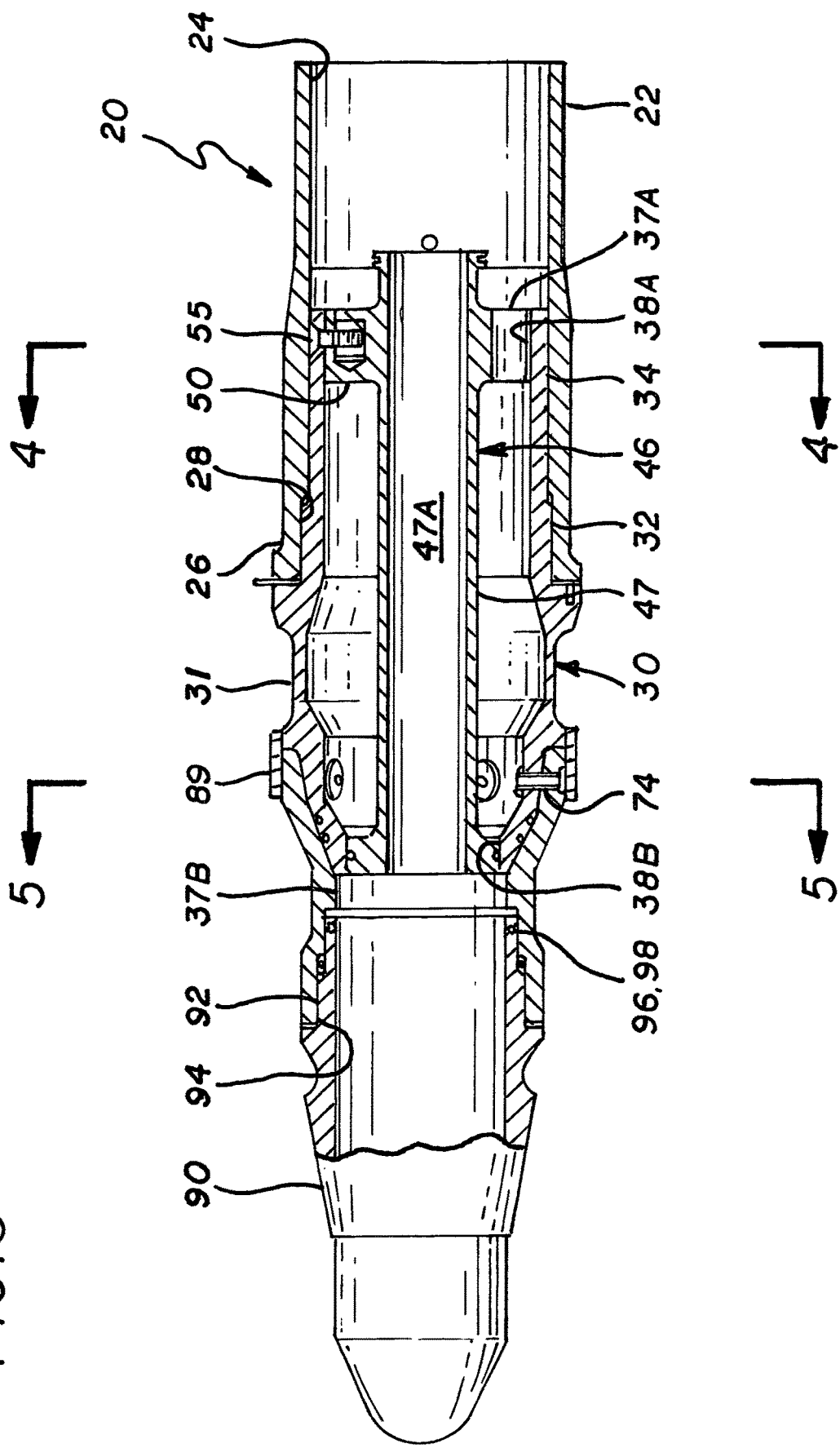

Illustrated in FIG. 3 is a cross-sectional view of FIG. 2 taken along the line 3-3.

Figure 4:
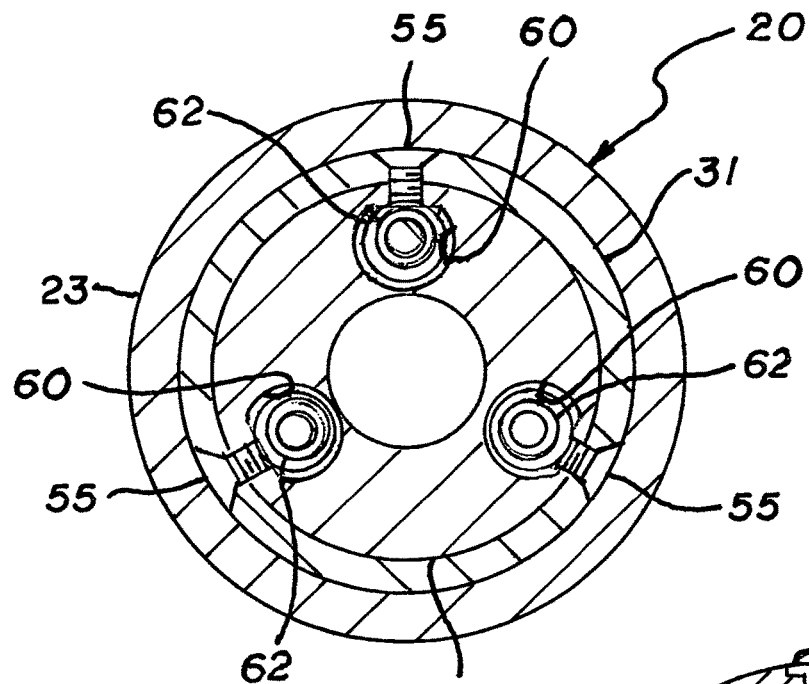

Illustrated in FIG. 4 is a cross-sectional view of FIG. 3 taken along the line 4-4.

Figure 5:
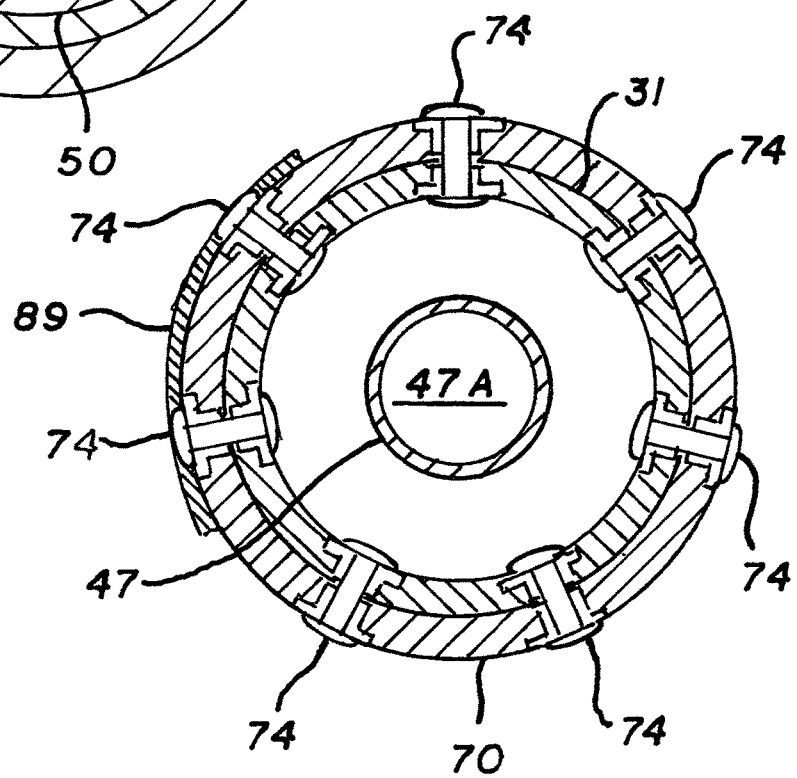

Illustrated in FIG. 5 is a cross-sectional view of FIG. 3 taken along the line 5-5 showing the rivet hole pattern.

Figure 6:
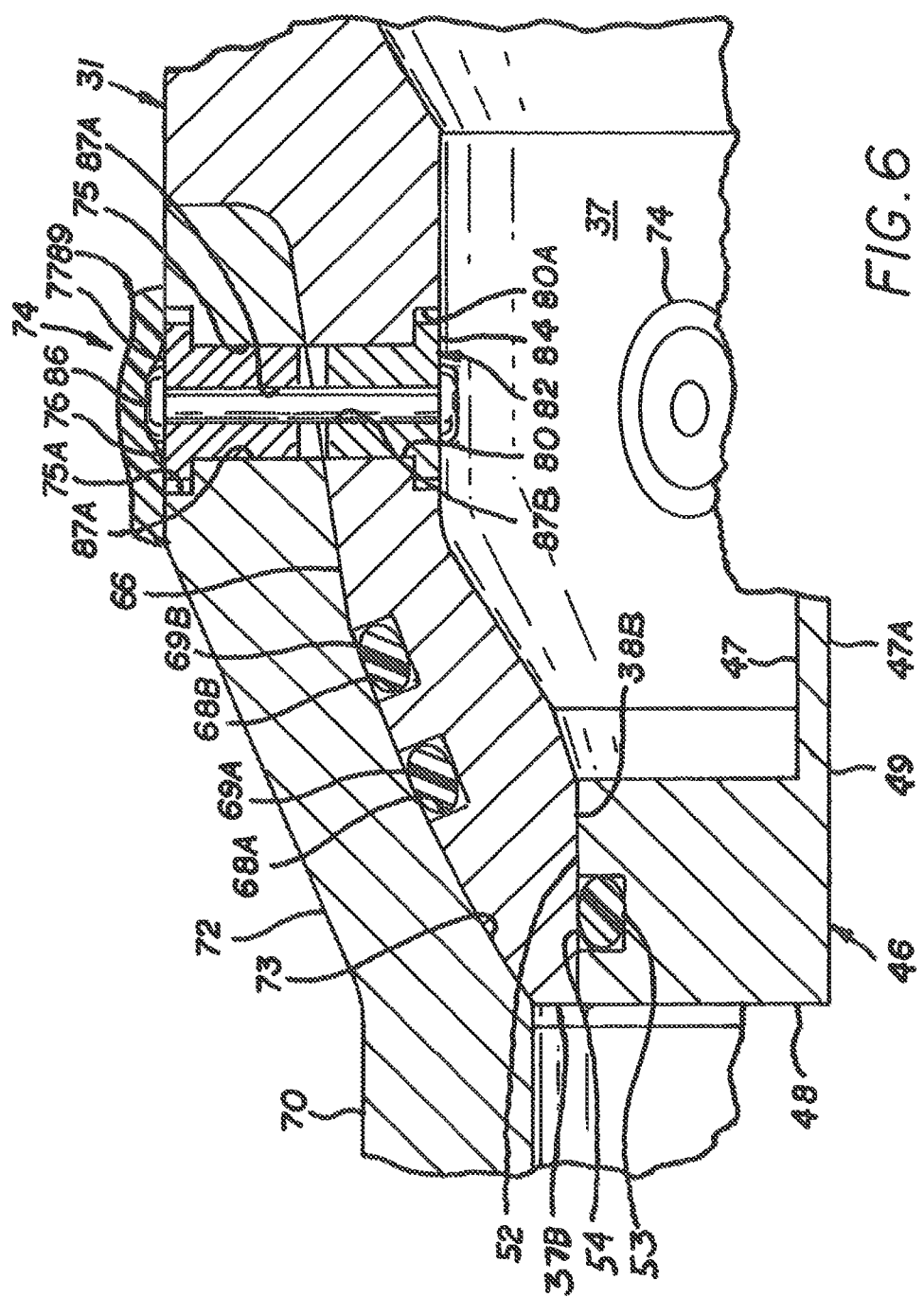

Illustrated in FIG. 6, is an enlarged partial view of FIG. 3 showing details of the bushings and fasteners.

Figure 7:
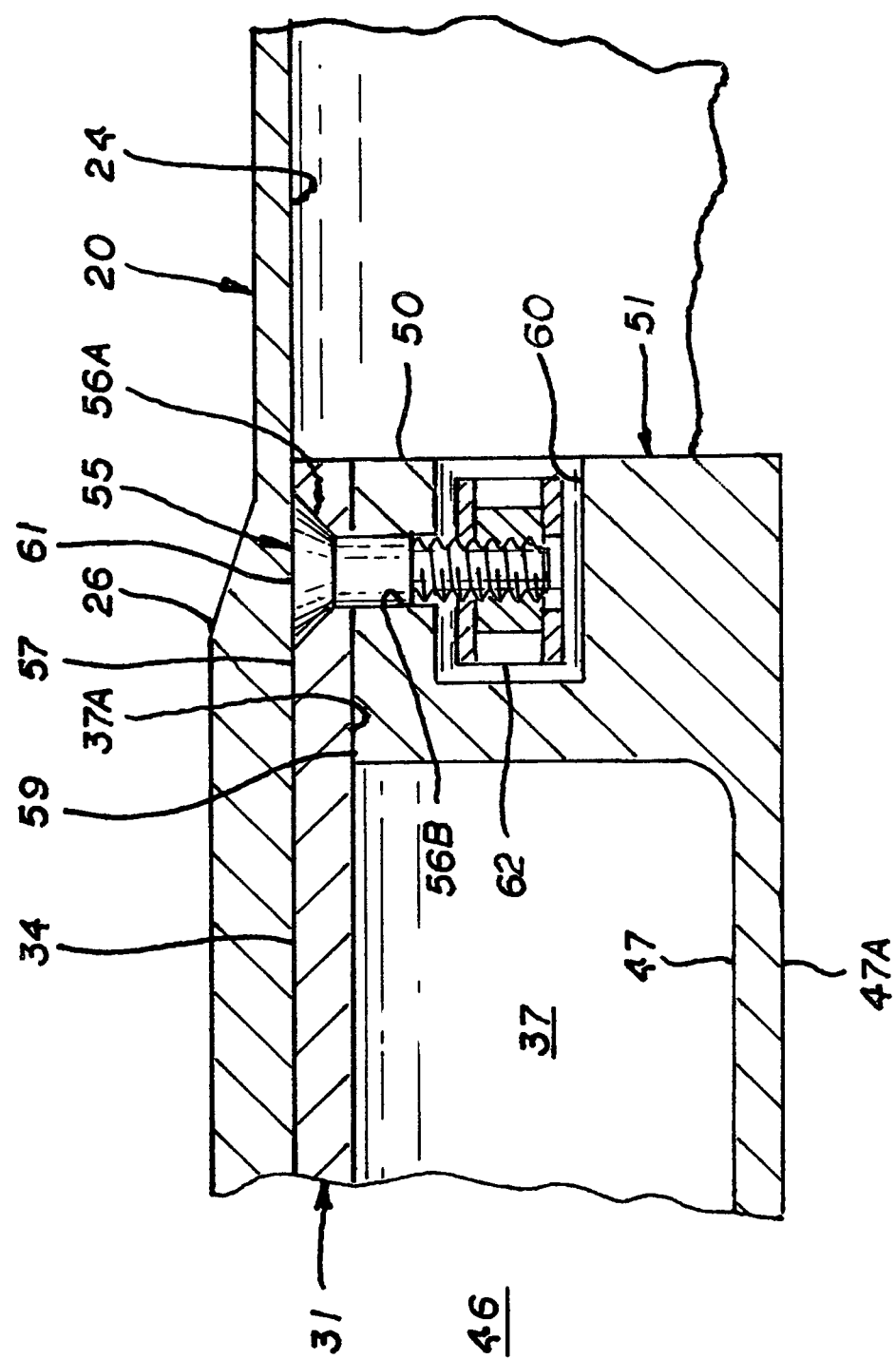

Illustrated in FIG. 7 is an enlarged partial view of FIG. 3 showing details of the installation of the fuel transfer assembly.

DETAILED DESCRIPTION OF THE INVENTION

Figure 1:
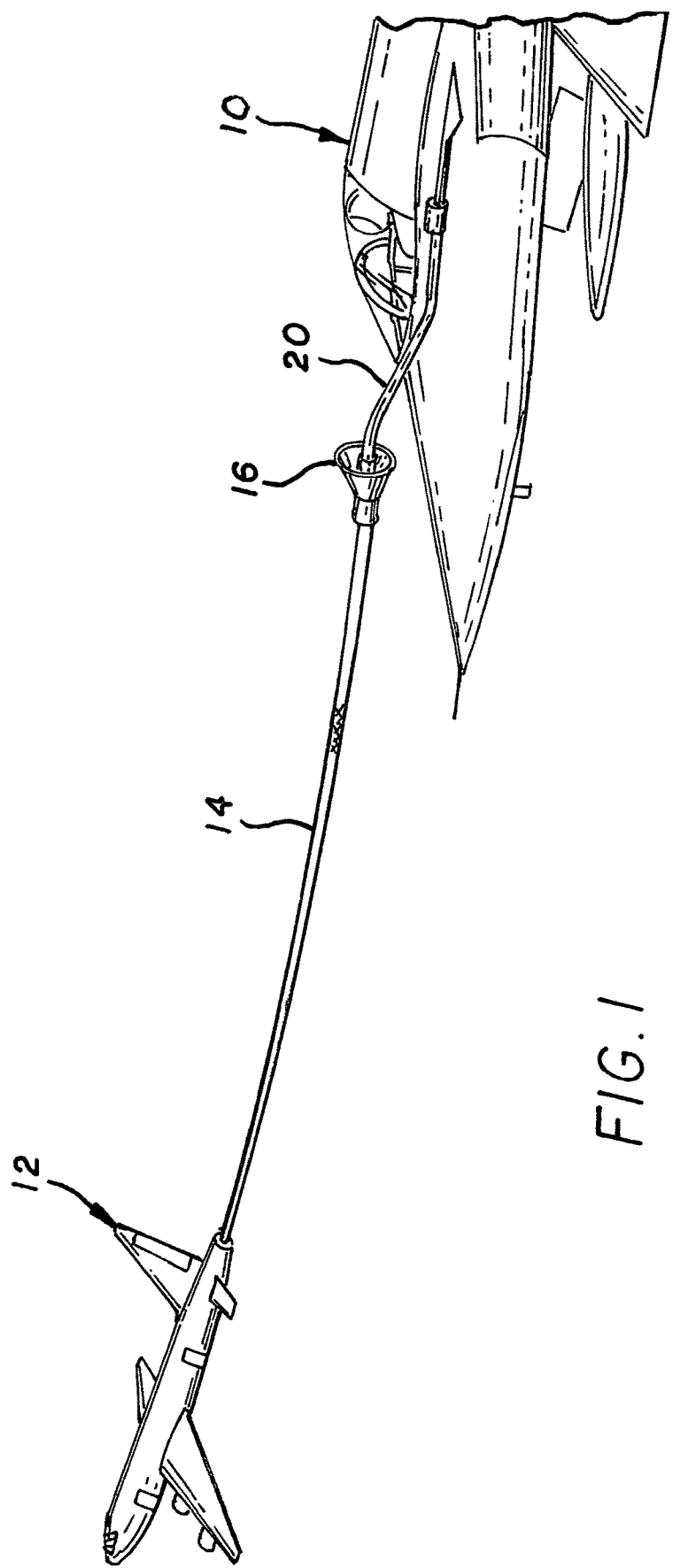

Referring to FIGS. 1 and 2, an aircraft 10 is partially shown being refueled by a tanker aircraft 12. The tanker 12 includes a refueling apparatus 14 that terminates in a receptacle 16, which is a standard design covered by military standard MS 24354 (ASG) Drogue Cone Nozzle And Refueling Coupling-Type MA-2 Flight-Pressure-Refueling System, Assembly Of. Extending out of the aircraft 10 is a fueling probe 20 for connecting to the receptacle 16 in a manner to be subsequently discussed. A typical refueling apparatus is illustrated in the previously mentioned U.S. Pat. No. 7,516,920.

Still referring to FIGS. 1 and 2 and additionally to FIGS. 3-7 The refueling probe 20 includes a hollow tubular assembly 22, which includes a tube 23 having a passageway 24 there through with an end 26 having internal threads 28. A connection assembly 30 includes a fitting 31 having an externally threaded portion 32 in engagement with internal threads 28 at end 26 of the tube 23. The connection assembly 30 also includes an end portion 34 that extends into the end 26 of the tube 23.

The fitting 31 further includes a central cavity 37 having ends 37A and 37B. The cavity 37 includes a circular shaped bore 38A there through at end 37A and a smaller circular bore 38B at end 37B. The connector assembly 30 further includes a fuel transfer assembly 46 having a hollow tube 47 having a through passage way 47A with a flange 48 on end 49 and a larger flange 50 on end 51. The outer surface 52 of the flange 48 on the fuel transfer assembly 46 has an O-ring 53 incorporated in a groove 54. As particularly illustrated in FIGS. 3, 4 and 7, the flange 50 is attached to the fitting 31 by means of a plurality of fastener assemblies 55. Each fastener assembly 55 includes a counter sunk hole 56A that extends through the outer surface 57 of the end portion 34 of the fitting 31, and a hole 56B, which extends from the outer surface 59 into holes 60. A flush head fastener 61 is installed in the holes 56A and 56B and is secured by barrel nuts 62 mounted in holes 58, locking the fuel transfer assembly 46 to the fitting 31. With the flange 50 sealed in place by sealant (not shown), the cavity 37 is sealed off.

The end 49 of the fitting 31 has an external surface 66 that is curved and preferably, a convex spherical shape. A pair of O-ring grooves 68A and 68B are located on the surface 66 incorporating O-rings 69A and 69B. A link 70 having an end 72 that has an internal curved surface 73 is adapted to mate with the externally curved surface 66 of the fitting 31. Equally spaced fastener assemblies 74 are used to couple the link 70 to the fitting 31, and as illustrated there are 7 such assemblies. Each assembly 74 includes a hole 75 with counter bore 75A, in the link 70. Bushing 76 with head 77 are press fit into hole 75, with head 77 seated on counter bore 75A. Similarly within fitting 31 is a hole 80 with counter bores 80A. Bushing 82 with head 84 are pressed fit into hole 80, with head 84 seated on counter bores 80A. A fastener, preferably in the form of a rivet 86 is installed in the holes 87A and 87B in the bushings 76 and 82, respectively, joining link 70 to fitting 31. Note other types of fasteners can be used such as bolts or interference fit pins and the like. However, rivets provide the best performance. The rivets 86 are designed to fail at a specified load on the link 70 at a level that will insure that designed to fail at a specified load on the link 70 at a level that will insure that no damage to other parts of the probe 20 will occur. An elastic band 89 can be place over the rivets 86 to prevent broken rivets from leaving the link upon separation of from the fitting 31, Optionally, the band 89 can be bonded in place. In addition, the cavity 37 locally retains any broken rivets 83.

A nozzle 90 is attached by its external threaded end 92 the internal threaded end 94 of the link 70 and sealed there between by O-ring 96 in groove 98. The nozzle 90 is a standard design covered by Military Standard MS 24356 (ASG) Nozzle-Type MA-2 Flight Pressure Refueling. Thus neither the receptacle 16 nor nozzle 90 need be discussed in further detail except to state that the nozzle 90 is designed to be captured by the receptacle 16 and it only allows fuel flow from the tanker 12.

Thus when the nozzle 90 of the probe 20 is engaged with the receptacle 16, refueling can take place. After fueling has been accomplished, the aircraft 10 separates from the refueling apparatus 14 of tanker 12, and the nozzle 90 is designed to automatically separate from the receptacle 16. However, the nozzle 90 can become stuck in the receptacle 16 and separation can greatly damage the receptacle 16 or refueling probe 20. Without a separation feature, aircraft 10 can also experience substantial damage as load is transmitted from the probe into the airframe structure. The subject invention avoids major damage. By being designed to automatically separate the Link 70 by the breaking of the rivets 86 upon a predetermined load being applied to the nozzle 90, no significant damage will occur. Both link 70 and fitting 31 can be reused by installing new rivets.

While the invention has been described with reference to a particular embodiment, it should be understood that the embodiment is merely illustrative as there are numerous variations and modifications, which may be made by those skilled in the art. In particular, the invention can be used on any tubular structure where one part must be separable from another without damage to connected structure. Thus, the invention is to be construed as being limited only by the spirit and scope of the appended claims.

INDUSTRIAL APPLICABILITY

The invention has applicability to the aircraft industry.

The invention claimed is:

1. An in-flight refueling probe for an aircraft to be refueled by a fuel dispensing aircraft having a receptacle for connecting to the refueling probe, said refueling probe comprising:

a first tubular member having first and second ends, said first end mounted to the aircraft and said second end extending from the aircraft, said first tubular member having an internal passage extending from said first end to said second end with said second end terminating in an external convex shape, said external convex shaped second end having a plurality of first holes equally spaced thereabout;

a second tubular member having first and second ends, said first end having an internal concave surface engaged with said external convex shaped end of said first tubular member, said first end of said second tubular member having a plurality of second holes there through in alignment with said plurality of first holes in said second end of said first tubular member;

a plurality of fasteners extending through said first and second holes joining said first end of said second tubular member to said second end of said first tubular member; the fasteners having a strength limited to a value that will break under a specific load on said nozzle;

a nozzle assembly mounted to said first end of said second tubular member for coupling to the receptacle on the fuel dispensing aircraft; and at least one sealing member comprising an O-ring incorporated between said internal concave surface and said external convex shaped end and positioned upstream of the fasteners.

2. The in-flight refueling probe as set forth in claim 1 wherein said external convex shaped end of said first tubular member and said internal concave surface of said second tubular member are spherical shaped across said at least one sealing member.

3. The in-flight refueling probe as set forth in claim 1, wherein said fasteners are rivets.

4. An aircraft refueling structure comprising:
   a first structural element having an external convex shaped end;
   a second structural element having an internal concave surface;
   a plurality of fasteners joining said first and second structural elements together at the external convex shaped end and the internal concave surface, said plurality of fasteners designed to fail prior to damage to said first and second structural elements under a load applied thereto; and
   at least one sealing member incorporated between said internal concave surface and said external convex shaped end upstream of said fasteners, said external convex shaped end of said first structural element and said internal concave surface of said second structural element being spherical shaped across said at least one sealing member.

5. The structure as set forth claim 4, wherein said fasteners are rivets.

6. The structure as set forth in claim 4, said first structural element being a first tubular member having first and second ends, said first tubular member having an internal passage extending from said first end to said second end with said second end terminating in the external convex shaped end, said external convex shaped end having a plurality of first holes equally spaced thereabout;
   said second structural element being a second tubular member having first and second ends, said first end having the internal concave surface engaged with said external convex shaped end of said first tubular member, said first end of said second tubular member having a plurality of second holes there through in alignment with said plurality of first holes in said second end of said first tubular member; and
   said plurality of fasteners extending through said first and second holes joining said first end of said second tubular member to said second end of said first tubular member, the fasteners having a strength limited to a value that will break under a specific load to said first or second tubular member.

7. The structure as set forth in claim 4, wherein each sealing member comprises an O-ring.

* * * * *